United States Patent
Bando et al.

(10) Patent No.: US 12,365,337 B2
(45) Date of Patent: Jul. 22, 2025

(54) MINING MACHINE

(71) Applicant: HITACHI CONSTRUCTION MACHINERY CO., LTD., Tokyo (JP)

(72) Inventors: Mikio Bando, Tokyo (JP); Shinichi Uotsu, Ibaraki (JP)

(73) Assignee: HITACHI CONSTRUCTION MACHINERY CO., LTD., Tokyo (JP)

(*) Notice: Subject to any disclaimer, the term of this patent is extended or adjusted under 35 U.S.C. 154(b) by 187 days.

(21) Appl. No.: 18/019,903

(22) PCT Filed: May 21, 2021

(86) PCT No.: PCT/JP2021/019334
§ 371 (c)(1),
(2) Date: Feb. 6, 2023

(87) PCT Pub. No.: WO2022/064767
PCT Pub. Date: Mar. 31, 2022

(65) Prior Publication Data
US 2023/0278557 A1 Sep. 7, 2023

(30) Foreign Application Priority Data
Sep. 25, 2020 (JP) ................. 2020-161342

(51) Int. Cl.
*B60W 30/14* (2006.01)
*B60W 40/076* (2012.01)
(Continued)

(52) U.S. Cl.
CPC ........ *B60W 30/143* (2013.01); *B60W 40/076* (2013.01); *B60W 40/105* (2013.01);
(Continued)

(58) Field of Classification Search
CPC ............ B60W 30/143; B60W 40/076; B60W 40/105; B60W 40/107; B60W 40/11;
(Continued)

(56) References Cited

U.S. PATENT DOCUMENTS 10,988,142 B1 * 4/2021 Mehrotra ............ B60W 40/068
2006/0004511 A1 1/2006 Yoshikawa et al.
(Continued)

FOREIGN PATENT DOCUMENTS

DE 19612222 A1 * 10/1996 .............. B60T 8/172
JP 2001123860 A 5/2001
(Continued)

OTHER PUBLICATIONS

R. Chaichaowarat, and W. Wannasuphoprasit. "Full-Slip Kinematics Based Estimation of Vehicle Yaw Rate From Differential Wheel Speeds." International journal of automotive technology (2016): 83-90. Web. (Year: 2016).*

(Continued)

*Primary Examiner* — Peter D Nolan
*Assistant Examiner* — Keith A von Volkenburg
(74) *Attorney, Agent, or Firm* — MATTINGLY & MALUR, PC

(57) ABSTRACT

A mining machine includes: a road gradient calculator that calculates a road gradient of a travel route based on a position and a speed measured by a GNSS receiver, a vehicle body posture measured by a vehicle body posture sensor, and an acceleration measured by an acceleration sensor; a traction coefficient calculator that calculates a traction coefficient based on the speed measured by the GNSS receiver, the acceleration measured by the acceleration sensor, a wheel speed measured by a wheel speed sensor, a steering direction measured by a steering angle sensor, a vehicle weight measured by a load sensor, and a driving torque
(Continued)

measured by a driving torque sensor; and a target torque calculator that calculates a target torque based on the road gradient calculated by the road gradient calculator and the traction coefficient calculated by the traction coefficient calculator.

7 Claims, 14 Drawing Sheets

(51) Int. Cl.
*B60W 40/105* (2012.01)
*B60W 40/107* (2012.01)
*B60W 40/11* (2012.01)
*B60W 40/13* (2012.01)

(52) U.S. Cl.
CPC .......... *B60W 40/107* (2013.01); *B60W 40/11* (2013.01); *B60W 40/13* (2013.01); *B60W 2300/125* (2013.01); *B60W 2520/16* (2013.01); *B60W 2520/26* (2013.01); *B60W 2520/30* (2013.01); *B60W 2540/18* (2013.01); *B60W 2552/15* (2020.02); *B60W 2556/50* (2020.02)

(58) Field of Classification Search
CPC ............. B60W 40/13; B60W 2556/50; B60W 2552/15; B60W 2300/125
USPC .......................................................... 701/93
See application file for complete search history.

(56) References Cited

U.S. PATENT DOCUMENTS

| | | | |
|---|---|---|---|
| 2007/0106442 A1* | 5/2007 | Lu | ........................... B60T 8/172 701/38 |
| 2009/0055068 A1 | 2/2009 | Osaki et al. | |
| 2018/0203443 A1* | 7/2018 | Newman | ................... B60L 1/00 |
| 2019/0100210 A1* | 4/2019 | Imamura | ............. B60K 17/348 |
| 2020/0003557 A1* | 1/2020 | Gazza | ................ G01C 21/3848 |
| 2020/0130703 A1* | 4/2020 | Pendelton | ............. B60W 40/09 |
| 2020/0141483 A1* | 5/2020 | Seimiya | .............. F16H 61/0204 |
| 2020/0158518 A1* | 5/2020 | Kim | ........................ G01C 21/16 |
| 2020/0223443 A1* | 7/2020 | Gonzalez Aguirre | ....................... B60W 40/10 |
| 2020/0239075 A1* | 7/2020 | Prabhakar | .......... B62D 15/0295 |
| 2020/0249686 A1 | 8/2020 | Kobashi et al. | |
| 2020/0262434 A1* | 8/2020 | Watanabe | ........ B60W 30/18118 |
| 2020/0269703 A1* | 8/2020 | Otsubo | ............... B60L 15/2009 |
| 2020/0273435 A1* | 8/2020 | Shibata | .................. B60K 35/50 |
| 2020/0300357 A1* | 9/2020 | Aoyama | ................. F16H 59/78 |
| 2020/0302703 A1* | 9/2020 | Ghanbari | ............... G07C 5/008 |

FOREIGN PATENT DOCUMENTS

| | | | |
|---|---|---|---|
| JP | 2005313863 A | * | 11/2005 |
| JP | 2006017607 A | | 1/2006 |
| JP | 2006017610 A | | 1/2006 |
| JP | 2007106297 A | * | 4/2007 |
| JP | 2009051310 A | | 3/2009 |
| JP | 2014019256 A | * | 2/2014 |
| JP | 2018106017 A | * | 7/2018 |
| JP | 2019133473 A | | 8/2019 |

OTHER PUBLICATIONS

Carlson, C. R., Gerdes, J. C. and Powell, D. (2002).Practical position and yaw rate estimation with GPS and differential wheelspeeds. Proc. 6th Int. Symp. Advanced Vehicle Control. (Year: 2002)*
R. Chaichaowarat, and W. Wannasuphoprasit. "Full-Slip Kinematics Based Estimation of Vehicle Yaw Rate From Differential Wheel Speeds."International journal of automotive technology (2016): 83-90. Web. (Year: 2016).*
International Search Report of PCT/JP2021/019334 dated Aug. 10, 2021.

* cited by examiner

Fig. 5

| Position | Pitch Angle | Long-Term Window Average | Short-Term Window Average | Gradient Change Flag | Travel Distance | Gradient |
|---|---|---|---|---|---|---|
| x1,y1,z1 | p1 | pN1 | pn1 | 1 | 0 | S1 |
| x2,y2,z2 | p2 | pN2 | pn2 | 0 | Lv | S2 |
| ... | ... | ... | ... | ... | ... | ... |
| xm,ym,zm | pm | pNm | pnm | 1 | 0 | Sn |
| ... | ... | ... | ... | ... | ... | ... |

Fig. 9

| Position | Slip Rate | Gradient | Driving torque | Vehicle Weight | Traction Coefficient $C_0$ | Traction Coefficient $C_1$ | Traction Coefficient $C_2$ |
|---|---|---|---|---|---|---|---|
| x1,y1,z1 | $\lambda 1$ | S1 | F1 | M1 | $C_{01}$ | $C_{11}$ | $C_{21}$ |
| x2,y2,z2 | $\lambda 2$ | S2 | F2 | M2 | $C_{02}$ | $C_{12}$ | $C_{22}$ |
| ⋮ | ⋮ | ⋮ | ⋮ | ⋮ | ⋮ | ⋮ | ⋮ |
| xm,ym,zm | $\lambda n$ | Sn | Fm | Mm | $C_{0m}$ | $C_{1m}$ | $C_{2m}$ |
| ⋮ | ⋮ | ⋮ | ⋮ | ⋮ | ⋮ | ⋮ | ⋮ |

MINING MACHINE

TECHNICAL FIELD

The present invention relates to a mining machine that travels in a mine.

This application claims priority to Japanese Patent Application No. 2020-161342 filed on Sep. 25, 2020, and its contents are incorporated herein.

BACKGROUND ART

For example, in a mine where surface mining is performed, a method referred to as drop cut in which a hydraulic excavator digs a level ground and a dump truck carries out dirt or the like discharged there is employed. In this method, the hydraulic excavator digs a flat place, an inclined path is gradually generated, the dump truck travels down on the generated inclined path, and the dump truck carries out the dirt or the like dug out by the hydraulic excavator to a dumping site. Therefore, not only a loading work to the dump truck by the hydraulic excavator but also a conveyance work by the dump truck is performed not on a flat place but in a state where the dump truck is heavily inclined.

Nowadays, a technique of introducing an unmanned dump truck into the above-described method for improving the safety and the productivity of the mine site and saving the labor costs. However, when the mining place is expanded, since map data is not prepared in advance, and the unmanned dump truck travels on a road surface with a large gradient, a control to move or stop the unmanned dump truck to a designated position of the hydraulic excavator is performed based on only an estimated position and a posture. For a travel path whose road gradient is not acquired in advance, examples of a method for calculating a road gradient and traveling on the travel path includes, as disclosed in Patent Literature 1, a method in which a road gradient is calculated based on a height difference between adjacent points acquired from a measurement or a travel result of a truck to set a target travel speed.

CITATION LIST

Patent Literature

Patent Literature 1. JP 2019-133473 A

SUMMARY OF INVENTION

Technical Problem

However, on a newly generated road surface, a road surface containing a large amount of water, or the like, wheels often sink due to the soft dirt. Accordingly, since the traveling is performed against the travel resistance due to the wheel sinking in addition to the road gradient, it becomes difficult to calculate the driving torque, and therefore, it has been difficult to accurately control traveling to a point as a destination.

The present invention has been made to solve the technical problem, and it is an object to provide a mining machine configured to calculate a driving torque in consideration of a road gradient and wheel sinking and perform a travel control with high accuracy.

Solution to Problem

A mining machine according to the present invention is a mining machine comprising: a GNSS receiver that measures a position and a speed of the mining machine traveling in a mine based on a radio wave received from a positioning satellite; a vehicle body posture sensor that measures a vehicle body posture of the mining machine; an acceleration sensor that measures an acceleration of the mining machine; a wheel speed sensor that measures a wheel speed based on a wheel rotation speed of the mining machine; a steering angle sensor that measures a steering direction of the mining machine; a load sensor that measures a vehicle weight of the mining machine including a load weight; a driving torque sensor that measures a driving torque of drive wheels of the mining machine; and a control device that controls the mining machine. The control device calculates: a road gradient of a travel route based on the position and the speed measured by the GNSS receiver, the vehicle body posture measured by the vehicle body posture sensor, and the acceleration measured by the acceleration sensor; calculates a traction coefficient based on the speed measured by the GNSS receiver, the acceleration measured by the acceleration sensor, the wheel speed measured by the wheel speed sensor, the steering direction measured by the steering angle sensor, the vehicle weight measured by the load sensor, and the driving torque measured by the driving torque sensor; calculates a target torque of the mining machine based on the calculated road gradient and the calculated traction coefficient; and controls the driving torque of the drive wheels to be the calculated target torque.

In the mining machine according to the present invention, the control device calculates a road gradient of a travel route based on the position and the speed measured by the GNSS receiver, the vehicle body posture measured by the vehicle body posture sensor, and the acceleration measured by the acceleration sensor, and calculates a traction coefficient based on the speed measured by the GNSS receiver, the acceleration measured by the acceleration sensor, the wheel speed measured by the wheel speed sensor, the steering direction measured by the steering angle sensor, the vehicle weight measured by the load sensor, and the driving torque measured by the driving torque sensor. Further, the control device calculates a target torque of the mining machine based on the calculated road gradient and the calculated traction coefficient. Thus, by calculating the driving torque in consideration of the road gradient of the travel route and the wheel sinking, the travel control of the mining machine can be performed with high accuracy.

Advantageous Effects of Invention

According to the present invention, by calculating the driving torque in consideration of the road gradient and the wheel sinking, the travel control of the mining machine can be performed with high accuracy.

BRIEF DESCRIPTION OF DRAWINGS

FIG. 5 is a drawing illustrating a gradient change table stored in a storage unit.

FIG. 9 is a drawing illustrating a traction coefficient table stored in the storage unit.

DESCRIPTION OF EMBODIMENTS

Figure 1:
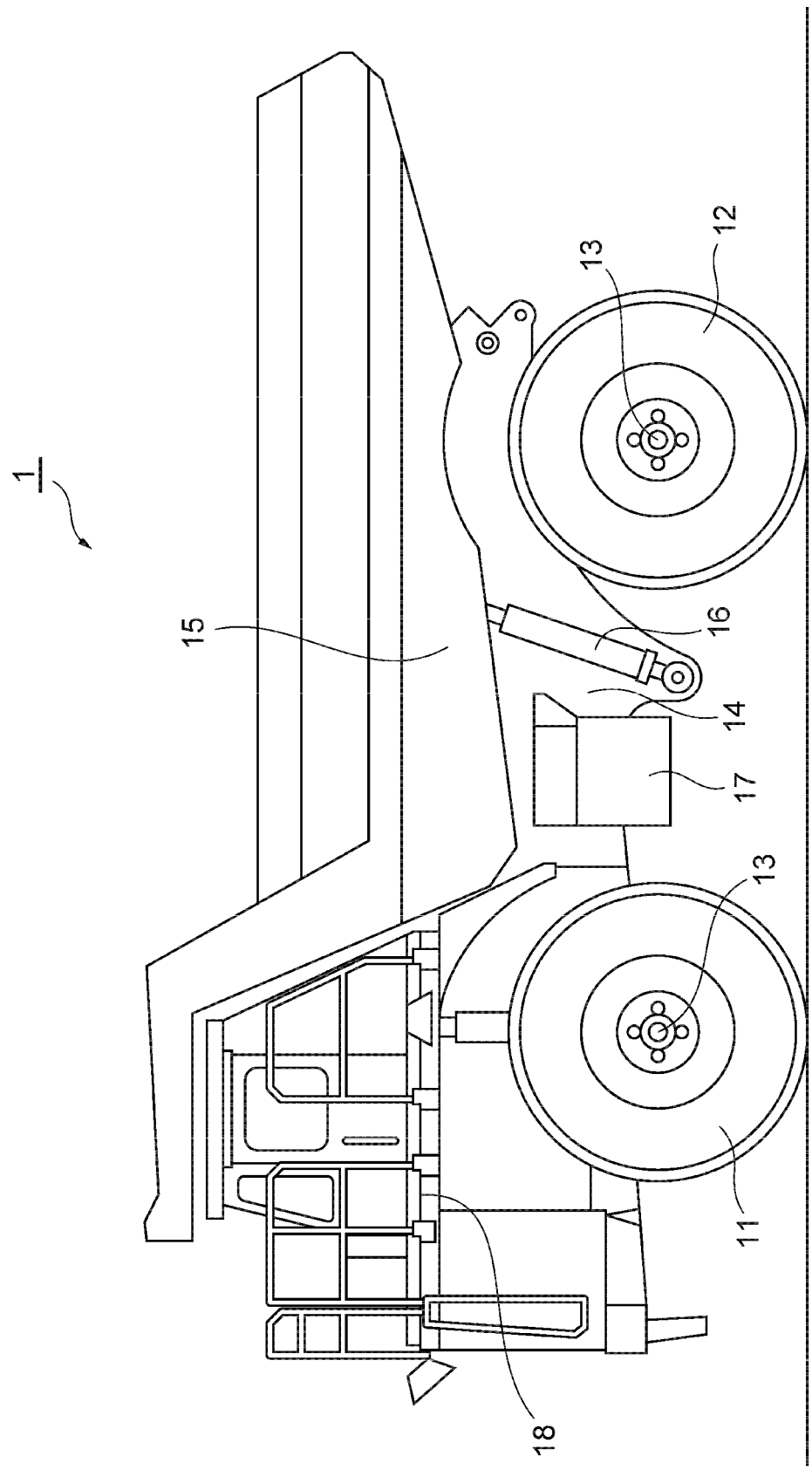
FIG. 1 is a side view of illustrating a schematic configuration of an unmanned dump truck.

The following describes embodiments of a mining machine according to the present invention with reference to the drawings. In the descriptions of the drawings, the same reference numerals are attached to the same components, and the repeated explanations will be omitted. While an unmanned dump truck is described as an example of the mining machine in the following description, the present invention is not limited to the unmanned dump truck.

An unmanned dump truck 1 is an autonomously drivable vehicle in a mine where surface mining is performed. As illustrated in FIG. 1, the unmanned dump truck 1 includes a pair of right and left front wheels 11, a pair of right and left rear wheels 12, wheel shafts 13 coupling the right and left wheels (that is, the front wheels 11 or the rear wheels 12), and a vehicle body 14 as a sturdy frame coupled to the wheel shafts 13 by springs or the like. A loading platform 15 for loading the earth, sand, and the like is mounted on the vehicle body 14, and the vehicle body 14 is coupled to the loading platform 15 by a hoist cylinder 16. A fuel tank 17 is attached to the vehicle body 14. The rear wheels 12 are, for example, drive wheels, and connected to a drive motor (not illustrated) or the like. A deck 18 on which an operator, a checker, and the like are allowed to walk is mounted to the upper side of the vehicle body 14.

First Embodiment

Figure 2:
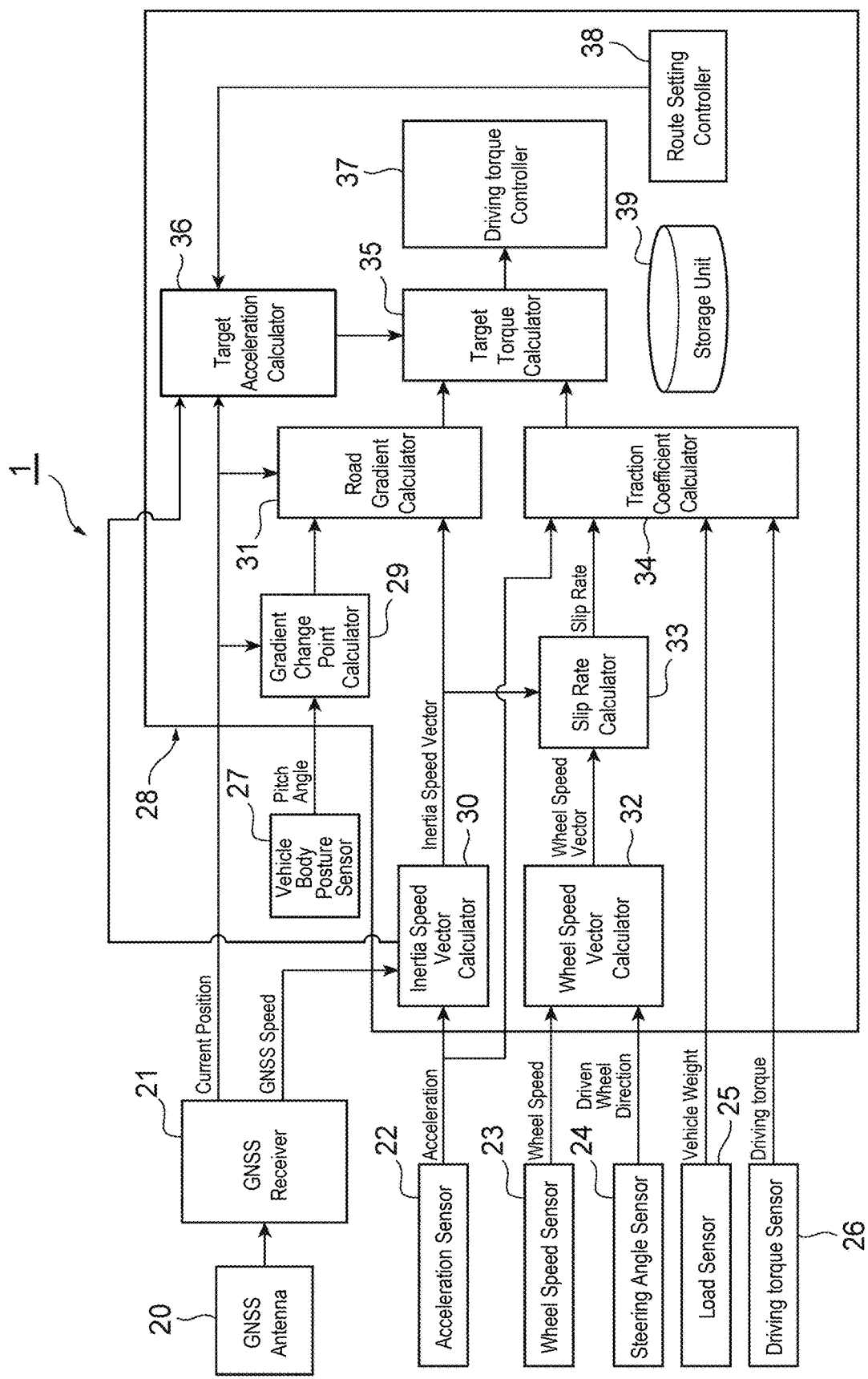
FIG. 2 is a block configuration diagram illustrating an unmanned dump truck according to a first embodiment.

FIG. 2 is a block configuration diagram illustrating an unmanned dump truck according to the first embodiment. The unmanned dump truck 1 includes a plurality of Global Navigation Satellite System (GNSS) antennas 20 that receive a radio wave from a positioning satellite, such as a Global Positioning System (GPS), and a GNSS receiver 21 that measures a position (also referred to as a current position) and a speed (hereinafter referred to as a "GNSS speed") of the unmanned dump truck 1 based on information received by the GNSS antennas 20. The GNSS receiver 21 outputs the measured position and GNSS speed of the unmanned dump truck 1 to a control device 28 (described later).

An acceleration sensor 22, a wheel speed sensor 23, a steering angle sensor 24, a load sensor 25, a driving torque sensor 26, a vehicle body posture sensor 27, and the control device 28 are each attached to the vehicle body 14 of the unmanned dump truck 1.

The acceleration sensor 22 measures an acceleration including a gravity direction applied to the unmanned dump truck 1 in a vehicle body coordinate system b (that is, a coordinate system fixed to the vehicle body 14), and outputs the measurement result to the control device 28. The wheel speed sensor 23 measures a wheel speed based on a rotation speed of the wheels (here, the rear wheels 12 as drive wheels), and outputs the measurement result to the control device 28.

The steering angle sensor 24 measures a steering direction of the unmanned dump truck 1. In this embodiment, the steering angle sensor 24 measures the steering direction of the front wheels 11 as driven wheels, and outputs the measurement result to the control device 28. The load sensor 25 measures a vehicle weight of the unmanned dump truck 1 including a load weight, and outputs it to the control device 28. For example, the load sensor 25 measures the load weight of the loading platform 15, and outputs a summed value of the measured load weight and a stored unladen vehicle weight to the control device 28 as the vehicle weight. The driving torque sensor 26 measures a driving torque output by the drive wheels (that is, the rear wheels 12), and outputs the measurement result to the control device 28.

The vehicle body posture sensor 27 measures a vehicle body posture of the unmanned dump truck 1. In this embodiment, the vehicle body posture sensor 27 measures a vehicle body posture represented by an inclination angle that is formed by a horizontal plane constituted by an Xe axis and a Ye axis of a global coordinate system e (that is, a coordinate system fixed to the earth) and an Xb axis and a Yb axis of the vehicle body coordinate system b and by a rotation angle from the Xe axis of the global coordinate system e to the Xb axis of the vehicle body coordinate system b, and the vehicle body posture sensor 27 outputs the measurement result to the control device 28.

The control device 28 controls the entire vehicle of the unmanned dump truck 1. The control device 28 is configured by, for example, a microcomputer including a combination of a Central Processing Unit (CPU) that executes calculations, a Read Only Memory (ROM) as a secondary storage unit that stores programs for calculations, and a Random Access Memory (RAM) as a temporary storage unit that stores a calculation progress and a temporary control variable, and the control device 28 performs respective controls on the travel, the operation, and the like of the unmanned dump truck 1 by executing the stored programs.

Here, a background to the present invention will be described.

To solve the above-described problem, the inventor seriously studied focusing on a road gradient and wheel sinking caused by the soft dirt having a large influence on the driving torque of the unmanned dump truck 1.

First, since the vehicle body posture sensor 27 is attached to the vehicle body 14, the measurement result by the vehicle body posture sensor 27 is different from a road gradient of the route on which the unmanned dump truck 1 actually traveled. Therefore, the inventors decided to measure each of a distance that the unmanned dump truck 1 traveled in the horizontal direction (hereinafter referred to as a horizontal advance distance) and a travel distance that the unmanned dump truck 1 traveled along the road surface in the horizontal advance distance, and obtain the road gradient from the relation between the horizontal advance distance and the travel distance using the trigonometric function.

Next, regarding the wheel sinking caused by the soft dirt, the inventors decided to use a slip rate as a function of the amount of wheel sinking. The slip rate is obtained by calculating an inertia speed vector from the GNSS speed measured by the GNSS receiver 21 and the acceleration measured by the acceleration sensor 22 and calculating a wheel speed vector from the wheel speed measured by the wheel speed sensor 23 and the driven wheel direction measured by the steering angle sensor 24, and calculating a difference between the calculated inertia speed vector and wheel speed vector.

Further, a traction coefficient for obtaining a traction that varies depending on the state of the road surface, such as a gradient and a softness of dirt, is calculated using the acceleration measured by the acceleration sensor 22, the vehicle weight measured by the load sensor 25, and the driving torque measured by the driving torque sensor 26 in addition to the obtained slip rate. Using the traction coefficient, a target torque (that is, required driving torque) for obtaining a target acceleration at each position is calculated from the gradient and the slip rate at each position assuming that the same nature of the dirt continues, and the driving torque of the unmanned dump truck 1 is controlled toward the calculated target torque. Accordingly, the speed of the unmanned dump truck 1 can be controlled to cause the unmanned dump truck 1 to travel to a destination with high accuracy.

Accordingly, to achieve the above description, the control device 28 of the embodiment includes a gradient change point calculator 29, an inertia speed vector calculator 30, a road gradient calculator 31, a wheel speed vector calculator 32, a slip rate calculator 33, a traction coefficient calculator 34, a target torque calculator 35, a target acceleration calculator 36, a driving torque controller 37, a route setting controller 38, and a storage unit 39.

The gradient change point calculator 29 calculates a gradient change point of the road surface based on a pitch angle measured by the vehicle body posture sensor 27 and the position measured by the GNSS receiver 21. The gradient change point calculator 29 outputs the calculation result to the road gradient calculator 31.

The inertia speed vector calculator 30 calculates an inertia speed vector as a speed of the unmanned dump truck 1 based on the GNSS speed measured by the GNSS receiver 21 and the acceleration measured by the acceleration sensor 22. The inertia speed vector calculator 30 outputs the calculation result to the road gradient calculator 31.

The road gradient calculator 31 calculates a road gradient based on the current position measured by the GNSS receiver 21, the gradient change point calculated by the gradient change point calculator 29, and the inertia speed vector calculated by the inertia speed vector calculator 30. The road gradient calculator 31 outputs the calculation result to the target torque calculator 35.

The wheel speed vector calculator 32 calculates a wheel speed vector based on the wheel speed measured by the wheel speed sensor 23 and the driven wheel direction measured by the steering angle sensor 24. The wheel speed vector calculator 32 outputs the calculation result to the slip rate calculator 33.

The slip rate calculator 33 calculates a slip rate of the road surface based on the inertia speed vector calculated by the inertia speed vector calculator 30 and the wheel speed vector calculated by the wheel speed vector calculator 32. The slip rate calculator 33 outputs the calculation result to the traction coefficient calculator 34.

The traction coefficient calculator 34 calculates a traction coefficient corresponding to the road gradient and the soft degree (softness of dirt, in other words) based on the slip rate calculated by the slip rate calculator 33, the vehicle weight output from the load sensor 25, the driving torque measured by the driving torque sensor 26, and the acceleration measured by the acceleration sensor 22. The traction coefficient calculator 34 outputs the calculation result to the target torque calculator 35.

The target acceleration calculator 36 calculates a target acceleration as a required acceleration of the unmanned dump truck 1 based on the current position measured by the GNSS receiver 21 and the route set by the route setting controller 38. The target acceleration calculator 36 outputs the calculation result to the target torque calculator 35.

The target torque calculator 35 calculates a target torque based on the road gradient calculated by the road gradient calculator 31, the traction coefficient calculated by the traction coefficient calculator 34, and the target acceleration calculated by the target acceleration calculator 36. The target torque means a driving torque for generating the target acceleration to change the vehicle speed to a target speed. The target torque calculator 35 outputs the calculation result to the driving torque controller 37.

The driving torque controller 37 controls the driving torque of the drive wheels based on the target torque calculated by the target torque calculator 35, thereby controlling the speed of the unmanned dump truck 1. For example, the driving torque controller 37 controls the driving torque of the drive wheels to be the target torque. The route setting controller 38 sets the route to a stop position as a destination (for example, a stop position of the hydraulic excavator or a dumping site) of the unmanned dump truck 1.

Figure 3:
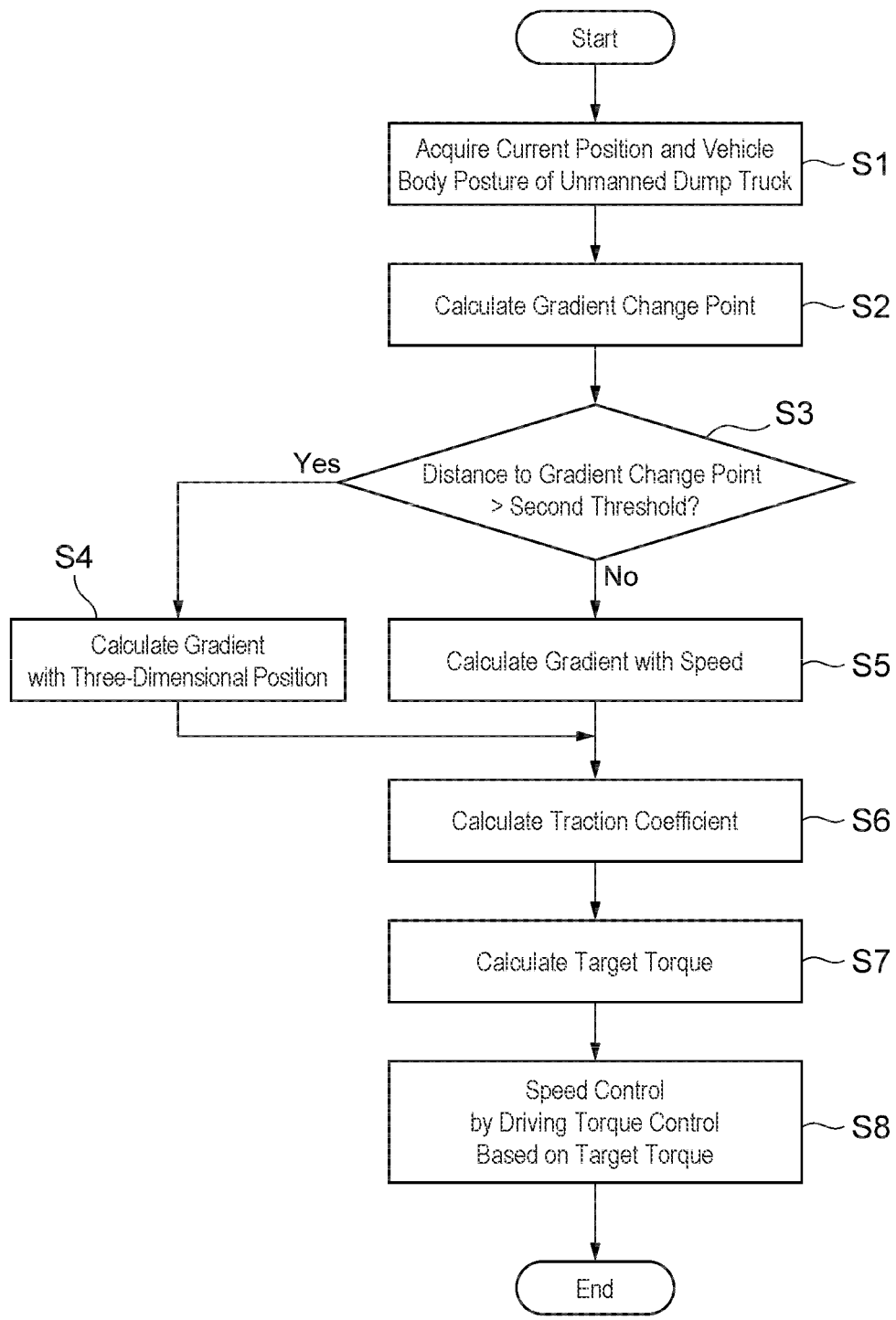
FIG. 3 is a drawing illustrating a processing flow of a control device.

The following describes the travel control of the unmanned dump truck 1 performed by the control device 28 by calculating the road gradient and the slip rate to calculate the target torque with reference to FIG. 3 to FIG. 11. FIG. 3 is a drawing illustrating a processing flow of a control device, and FIG. 4 to FIG. 11 illustrate the detailed explanations of the processing flow illustrated in FIG. 3.

The process illustrated in FIG. 3 is performed on the premise that the route to the stop position as the destination of the unmanned dump truck 1 is preliminarily set by the route setting controller 38, and the gradient on the route is unknown. It is assumed that the process illustrated in FIG. 3 is started in the same cycle (for example, every 0.01 seconds) and the whole process ends within the cycle.

First, in Step S1, the control device 28 acquires the current position of the unmanned dump truck 1 from the GNSS receiver 21 and the vehicle body posture from the vehicle body posture sensor 27, and causes the storage unit 39 to store the acquired result.

In Step S2 subsequent to Step S1, the gradient change point calculator 29 calculates the gradient change point of the road surface. The gradient change point is a point indicating that the gradient of the road surface on which the unmanned dump truck 1 travels has changed by a certain degree or more, and calculated by, for example, the process of FIG. 4.

Figure 4:
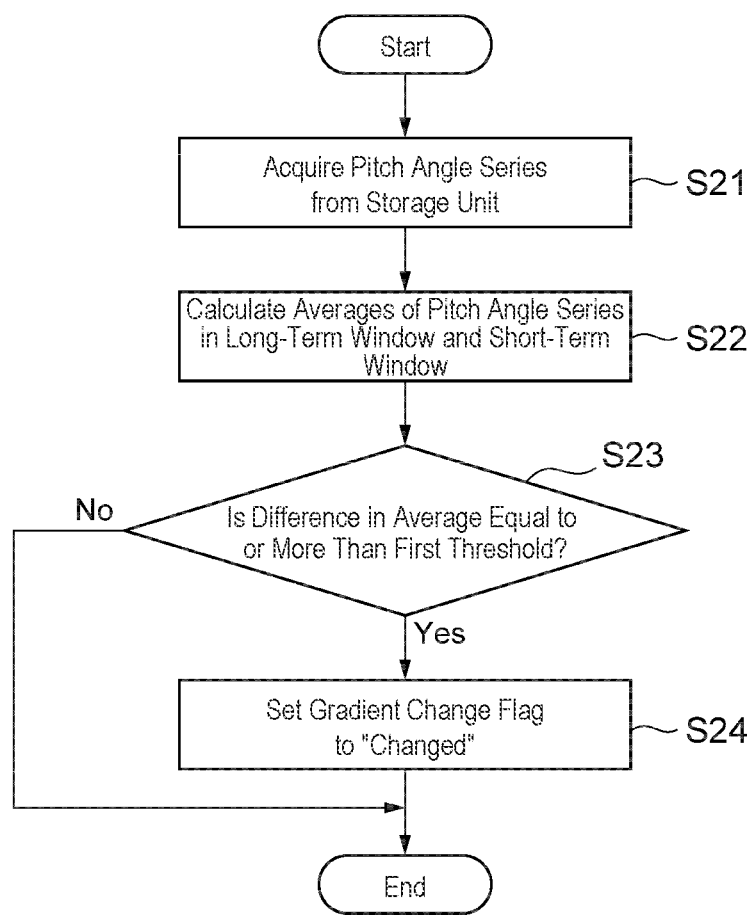
FIG. 4 is a drawing illustrating a processing flow of a gradient change point calculation.

As illustrated in FIG. 4, in Step S21, the gradient change point calculator 29 acquires a pitch angle series from the storage unit 39. In the storage unit 39, a gradient change table as illustrated in FIG. 5 is stored. The gradient change table includes the pitch angle, a long-term window average and a short-term window average of the gradient change, a gradient change flag, the travel distance, and the gradient for each position of the unmanned dump truck 1. Initial values of the gradient change table are all "0 (zero)."

Figure 6:
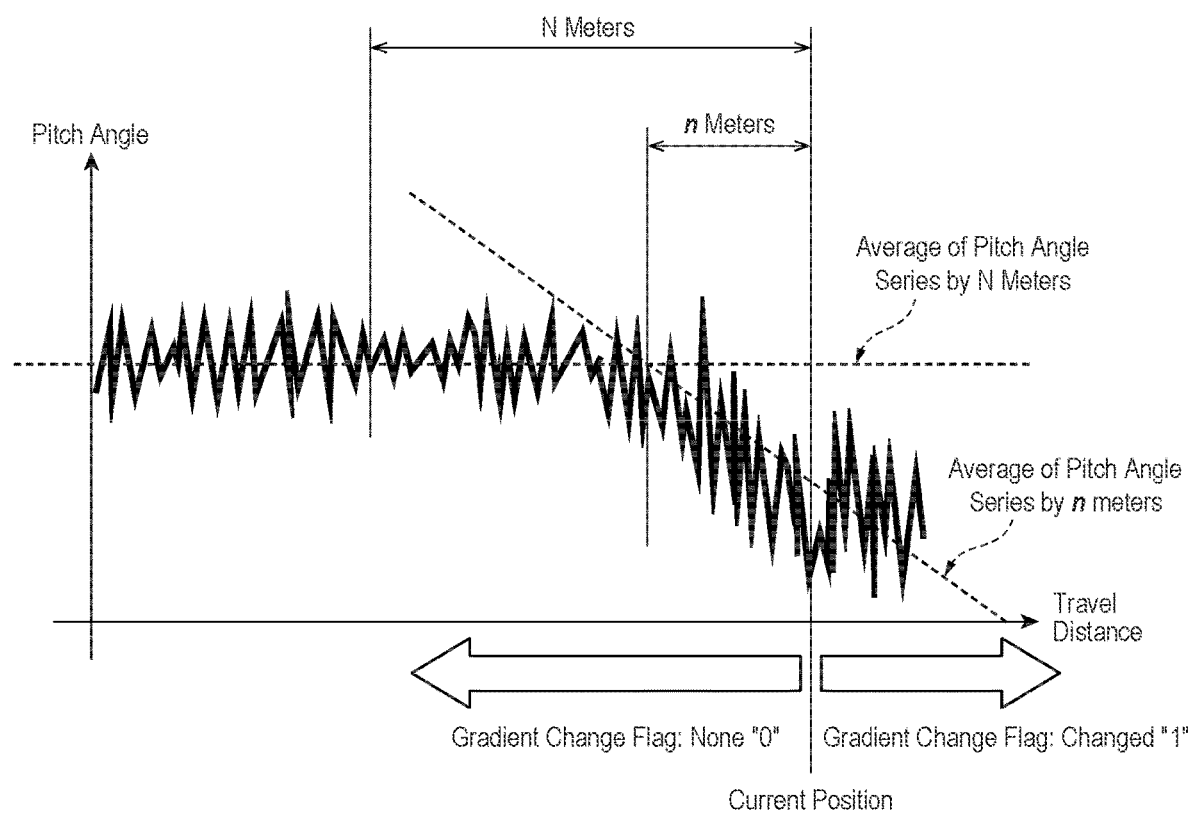
FIG. 6 is a drawing illustrating a conceptual diagram of calculating an average of a pitch angle series.

In Step S22 subsequent to Step S21, the gradient change point calculator 29 converts the pitch angles into a series relative to the position, and calculates each of the average in long-term window and the average in short-term window. FIG. 6 is a drawing illustrating a conceptual diagram of calculating an average of a pitch angle series. As illustrated in FIG. 6, the long-term window is a pitch angle series from a position apart from the current position of the unmanned dump truck 1 by N meters, and the short-term window is a pitch angle series from a position apart from the current position by n meters. The gradient change point calculator 29 calculates these averages, and causes the storage unit 39 to store the calculation result. For example, the long-term window is set to 10 meters, and the short-term window is set to 3 meters.

In Step S23 subsequent to Step S22, first, the gradient change point calculator 29 calculates a difference between the average in the long-term window and the average in the short-term window. Next, the control device 28 determines whether the calculated difference in average is equal to or more than a preliminarily set first threshold or not. The first threshold here is set based on, for example, an empirical value, and changeable depending on the object.

When it is determined that the difference in average is equal to or more than the first threshold, the process transitions to Step S24. In Step S24, since the presence of the gradient change is detected, the gradient change point calculator 29 sets the gradient change flag to "1" and causes the storage unit 39 to store it. Meanwhile, when it is determined that the difference in average is smaller than the first threshold, since the gradient change point is not present, the gradient change point calculator 29 sets the gradient change flag to "0 (zero)" and causes the storage unit 39 to store it. Thus, the calculation process of the gradient change point ends.

As illustrated in FIG. 3, when the calculation of the gradient change point ends, the process transitions to Step S3. In Step S3, first, the road gradient calculator 31 calculates a distance from the current position of the unmanned dump truck 1 to the gradient change point calculated in Step S2. Next, the control device 28 determines whether the calculated distance is greater than a preliminarily set second threshold or not. The second threshold here is set in consideration of an integration error of the speed calculated in Step S5 below and a height error of a three-dimensional position, and set to, for example, the same value as the above-described long-term window. The second threshold may be set to an appropriate value depending on the object.

When the distance to the gradient change point is determined to be greater than the second threshold, the process transitions to Step S4. In Step S4, the road gradient calcu-

[Math. 1]

$$S = \tan^{-1} \frac{zc - zA}{\sqrt{(xc - xA)^2 + (yc - yA)^2}} \quad (1)$$

Meanwhile, when the distance to the gradient change point is determined to be equal to or less than the second threshold, the process transitions to Step S5. In Step S5, the road gradient calculator 31 calculates the gradient based on the speed. The calculation of the gradient based on the speed is performed by, for example, the process of FIG. 7.

Figure 7:
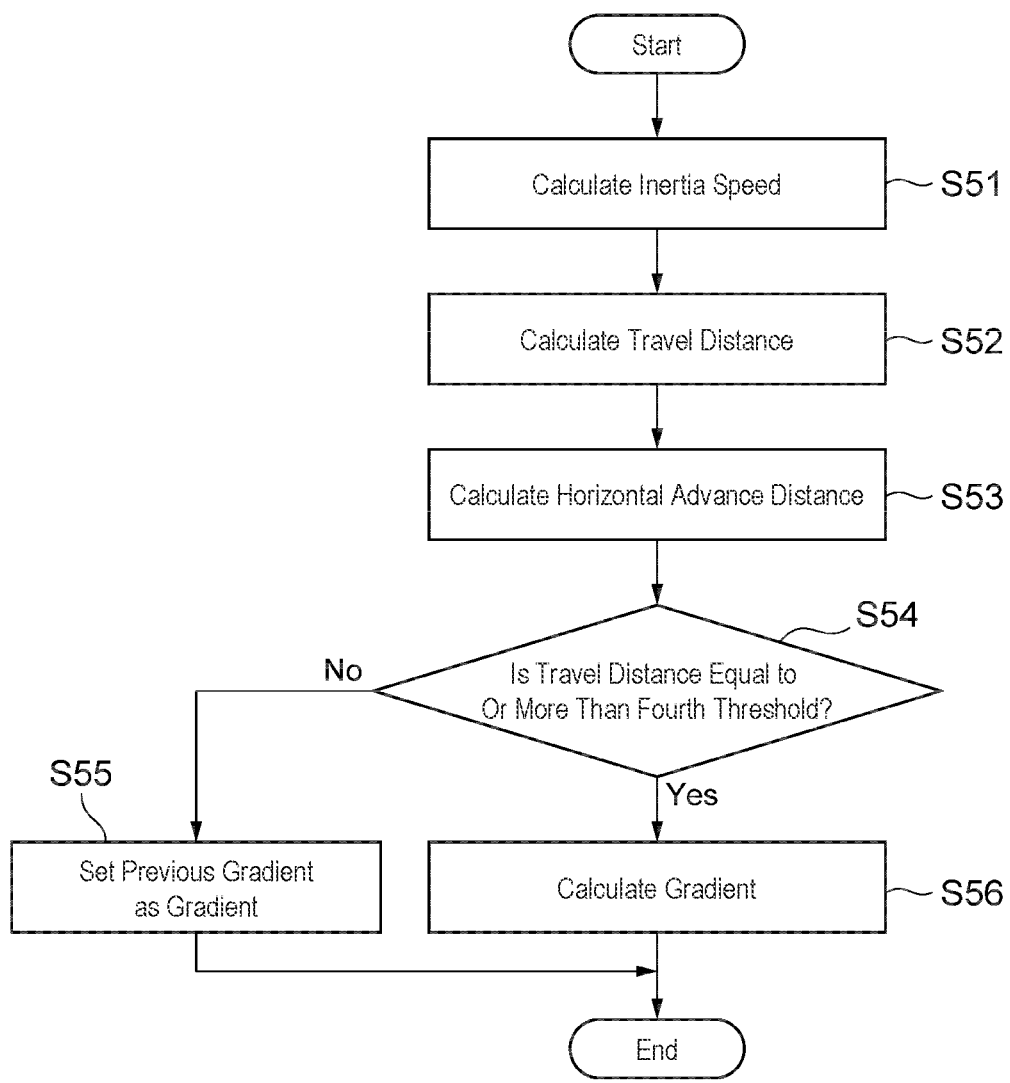
FIG. 7 is a drawing illustrating a processing flow of a gradient calculation based on a speed.

As illustrated in FIG. 7, in Step S51, the inertia speed vector calculator 30 calculates the inertia speed of the unmanned dump truck 1 based on the GNSS speed measured by the GNSS receiver 21 and the acceleration measured by the acceleration sensor 22. In this embodiment, the inertia speed is represented by the inertia speed vector. The inertia speed vector is calculated according to the process of FIG. 8.

For the GNSS speed measured by the GNSS receiver 21, a speed direction of the unmanned dump truck 1 is output in the global coordinate system at regular intervals. In this embodiment, the output cycle of the GNSS speed is longer than the output cycle of the acceleration sensor 22, and the output cycle of the acceleration sensor 22 is the same as the output cycle of the control device 28.

Figure 8:
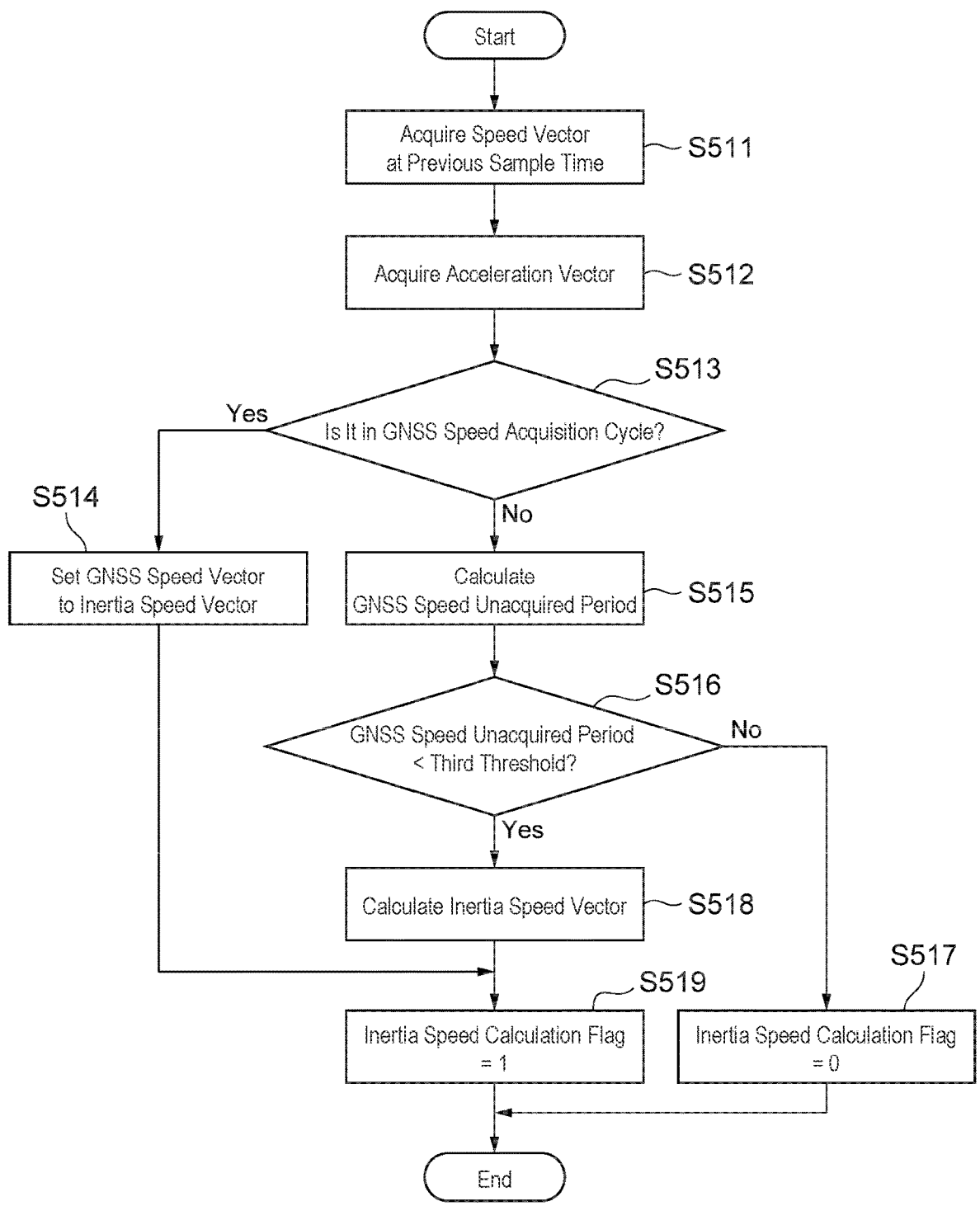
FIG. 8 is a drawing illustrating a processing flow of an inertia speed vector calculation.

As illustrated in FIG. 8, in Step S511, the inertia speed vector calculator 30 acquires a speed vector at a previous sample time stored in the storage unit 39. In Step S512 subsequent to Step S511, the inertia speed vector calculator 30 acquires the acceleration vector from the acceleration sensor 22.

In Step S513 subsequent to Step S512, the control device 28 determines whether or not to be in an acquisition cycle of the GNSS speed. When it is determined to be in the acquisition cycle of the GNSS speed, the process transitions to Step S514. In Step S514, the inertia speed vector calculator 30 converts the GNSS speed vector into the vehicle body coordinate system, and sets it as an inertia speed vector $v_i$. The inertia speed vector $v_i$ is calculated by Formula (2) below.

[Math. 2]

$$v_i = C_{eb}{}^t V \quad (2)$$

In Formula (2), V is the GNSS speed, and $C_{eb}$ is a coordinate transformation matrix from the vehicle body coordinate system b to the global coordinate system e. The coordinate transformation matrix $C_{eb}$ is obtained from a roll angle $\Psi$, a pitch angle $\varphi$, and a yaw angle $\theta$ obtained from the vehicle body posture sensor 27 using Formula (3) below.

[Math. 3]

$$C_{eb} = \begin{pmatrix} \cos\theta\cos\phi & \sin\theta\cos\phi & -\sin\phi \\ -\sin\theta\cos\psi + \cos\theta\sin\phi\sin\psi & \cos\theta\cos\psi + \sin\theta\sin\phi\sin\psi & \cos\phi\sin\psi \\ \sin\theta\sin\psi + \cos\theta\sin\phi\cos\psi & -\cos\theta\sin\psi + \sin\theta\sin\phi\cos\psi & \cos\phi\cos\psi \end{pmatrix} \quad (3)$$

lator 31 calculates the gradient based on the three-dimensional position. The calculation of a gradient S based on the three-dimensional position is performed based on a position (xA, yA, zA) of the gradient change flag "1" that is the closest to the current position indicated in the gradient change table of FIG. 5 and the current position (xc, yc, zc) using Formula (1) below.

Meanwhile, when it is determined not to be in the acquisition cycle of the GNSS speed in Step S513, the control process transitions to Step S515, and the inertia speed vector calculator 30 calculates the speed by integrating the acceleration. In Step S515, the inertia speed vector calculator 30 calculates an unacquired period of the GNSS speed (GNSS speed unacquired period) by calculating a difference between the time of the final acquisition of the GNSS speed and the current time.

In Step S516 subsequent to Step S515, the control device 28 determines whether the GNSS speed unacquired period calculated in Step S515 is smaller than a preliminarily set third threshold or not. This is because, since the speed calculated by integrating the acceleration causes an error due to the integrated time, the error can be suppressed by setting the upper limit of the error due to the time. The third threshold is set, for example, in consideration of a time period keeping a speed design target value.

When the GNSS speed unacquired period is determined to be equal to or more than the third threshold, the process transitions to Step S517. In Step S517, the inertia speed vector calculator 30 sets an inertia speed calculation flag to "0 (impossible to calculate)." Meanwhile, when the GNSS speed unacquired period is determined to be smaller than the third threshold, the process transitions to Step S518, and the inertia speed vector is calculated. In Step S518, the inertia speed vector calculator 30 calculates the speed at the current time by adding the acceleration vector acquired in Step S512 to the speed vector at the previous sample time acquired in Step S511. A speed $v_i(t)$ at the current time using an acceleration a is calculated based on Formula (4) below with a unit period dt. In Formula (4), $v_i(t-1)$ is a speed at the previous sample time.

[Math. 4]

$$v_i(t)=v_i(t-1)+a(t)dt \quad (4)$$

In Step S519 subsequent to Step S518, the inertia speed vector calculator 30 sets the inertia speed calculation flag to "1 (possible to calculate)." Thus, the calculation process of the inertia speed vector ends.

As illustrated in FIG. 7, after ending the calculation of the inertia speed, the process transitions to Step S52. In Step S52, the road gradient calculator 31 calculates a travel distance (that is, a travel distance at the current time) that the unmanned dump truck 1 has traveled along the road surface by integrating the inertia speed after the gradient change point. The travel distance Lv(t) at the current time is obtained by adding a value obtained by multiplying the inertia speed v(t) calculated in Step S51 by the sample period dt to the previous travel distance Lv(t−1) stored in the storage unit 39 as indicated by Formula (5) below.

[Math. 5]

$$Lv(t)=Lv(t-1)+v(t)dt \quad (5)$$

When the inertia speed calculation flag is "0 (impossible to calculate)" in Step S51, the wheel speed output from the driven wheels (that is, the front wheels 11) may be used as a substitution, or the previous inertia speed may be used as a substitution.

In Step S53 subsequent to Step S52, the road gradient calculator 31 calculates the horizontal advance distance of the unmanned dump truck 1. The horizontal advance distance Lp is calculated by Formula (6) below using x and y of the position (xA, yA, zA) having the gradient change flag "1" that is the closest to the current position in the gradient change table (see FIG. 5) stored in the storage unit 39 and the current position (xc, yc, zc).

[Math. 6]

$$Lp=\sqrt{(xc-xA)^2+(yc-yA)^2} \quad (6)$$

In Step S54 subsequent to Step S53, the control device 28 determines whether the travel distance calculated in Step S52 is equal to or more than a preliminarily set fourth threshold or not. The fourth threshold here is set, for example, under a condition that the horizontal advance distance is sufficiently long to the accuracy of the position measured by the GNSS receiver 21.

When the travel distance is determined to be smaller than the fourth threshold, the process transitions to Step S55. In Step S55, the road gradient calculator 31 sets the previous gradient S(t−1) directly as the current gradient S(t), and causes the storage unit 39 to store the set result. Meanwhile, when the travel distance is determined to be equal to or more than the fourth threshold, the process transitions to Step S56. In Step S56, the road gradient calculator 31 calculates the gradient S(t) based on Formula (7) below, and causes the storage unit 39 to store the calculation result.

[Math. 7]

$$S(t) = \cos^{-1}\frac{L_p}{L_v(t)} \quad (7)$$

As illustrated in FIG. 3, when the gradient is calculated in Step S4 or S5, the process transitions to Step S6, and the traction coefficient is calculated. The traction coefficient is a coefficient for determining the traction caused by the wheels buried in the dirt due to the softness of the road surface (that is, softness of dirt), and stored in a form of a table of FIG. 9 in the storage unit 39. When the road surface is soft, the wheels sink. In this case, the force necessary for traveling is, different from the traction on the paved road, equal to a shear stress of the dirt. The shear stress of the dirt has a relation with the slip rate of the drive wheels. The equation of motion of the vehicle body in the case of the wheel sinking can be expressed as Formula (8) below.

[Math. 8]

$$M\dot{v}=F(C_0+C_1\lambda+C_2\lambda^2+\ldots)-G_\gamma \quad (8)$$

In Formula (8), M is a vehicle weight, $\dot{v}$ is an acceleration of the unmanned dump truck 1, F is an ideal traction output by the driving torque, and $\lambda$ is a slip rate. $G_\gamma$ is a travel resistance caused by the gradient S, and obtained by Formula (9) below. Here, the traction F is a driving torque.

[Math. 9]

$$G_\gamma=Mg\sin(S) \quad (9)$$

The force generated by the shear force caused by the wheel slip is obtained by multiplying the driving torque F by $(C_0+C_1\lambda+C_2\lambda^2+\ldots)$. Here, a coefficient $C_n$ of a multiplier of each slip rate is referred to as a traction coefficient. Therefore, when the values of the vehicle weight, the acceleration, the driving torque, the slip rate, and the gradient can be measured or calculated multiple times, the traction coefficient can be determined by the least-square method or the like.

The acceleration can be acquired from the acceleration sensor 22, the vehicle weight can be acquired from the load sensor 25, and the driving torque can be acquired from the driving torque sensor 26. The gradient can be calculated in the above-described Step S4 or Step S5. Therefore, when the slip rate is calculated, the traction coefficient can be calculated.

The slip rate λ can be indicated as a ratio between a wheel speed $v_w$ and a vehicle body advance speed $v_{ix}$ of the unmanned dump truck 1 as indicated by Formula (10) below.

[Math. 10]

$$\lambda = \frac{|v_w - v_{ix}|}{|v_{ix}|} \tag{10}$$

The wheel speed $v_w$ is measured based on the rotation speed of the drive wheels by the wheel speed sensor 23, and the vehicle body advance speed $v_{ix}$ can be calculated by the method similar to the above-described Step S51 (calculation method of the inertia speed). The slip rate λ calculated as described above, the acquired vehicle weight, acceleration, and driving torque, and the calculated gradient are stored in the traction coefficient table illustrated in FIG. 9 for each position (that is, current position).

Next, the traction coefficient calculator 34 updates the traction coefficient $C_n$. The traction coefficient $C_n$ is prepared by the preliminarily determined number of orders of λ, and the traction coefficients $C_n$ of up to the previous value equal to or more than the number of the variables are used. For example, in a case where the traction coefficients are from $C_0$ to $C_1$, when the respective variables at the current position are (Mm, Fm, Sm, λm), the traction coefficient can be calculated by making two equations of Formula (8) using (M(m−1), F(m−1), S(m−1), λ(m−1)). When the variables are used by the number equal to or more than the number of the traction coefficients, the use of the least-square method or the like allows calculating it. The traction coefficient calculated as described above is stored in the storage unit 39.

In Step S7 subsequent to Step S6, the target torque calculator 35 calculates the target torque for outputting a target speed. The target torque is calculated according to the process of FIG. 10.

Figure 10:
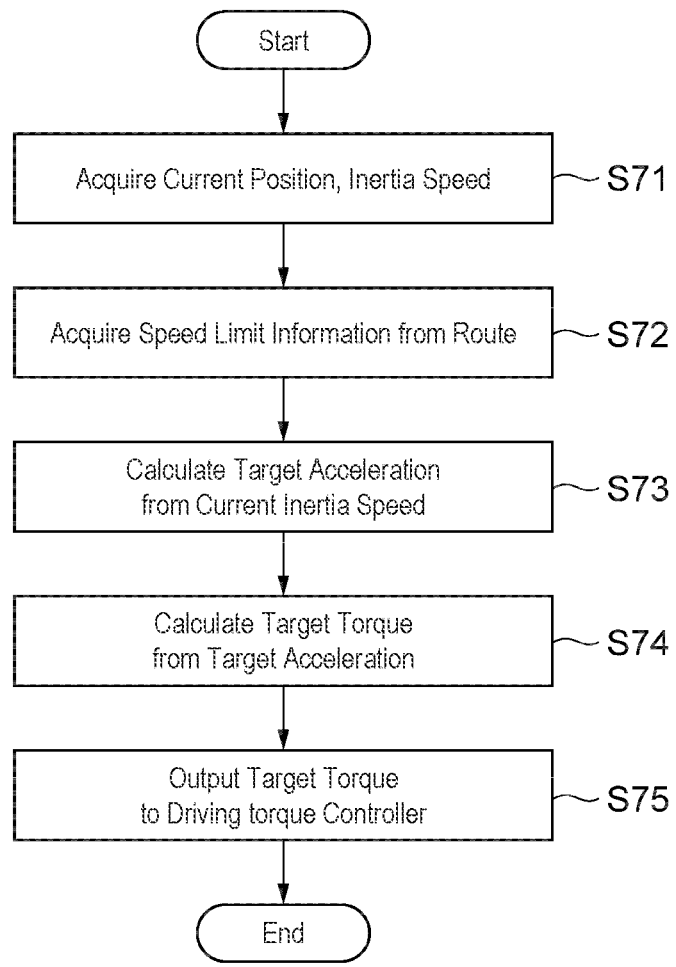
FIG. 10 is a drawing illustrating a processing flow of a target torque calculation.

As illustrated in FIG. 10, in Step S71, the target acceleration calculator 36 acquires each of the current position measured by the GNSS receiver 21 and the inertia speed calculated in Step S51. In Step S72 subsequent to Step S71, the target acceleration calculator 36 acquires the route to the destination from the route setting controller 38, and further acquires speed limit information set to the route. The route is configured by nodes indicating positions of waypoints on the way and a link connecting the nodes. The link includes the speed limit in traveling on the link as information. The nodes include a last node as the destination, and the unmanned dump truck 1 travels with a target of the speed zero at the last node.

Figure 11:
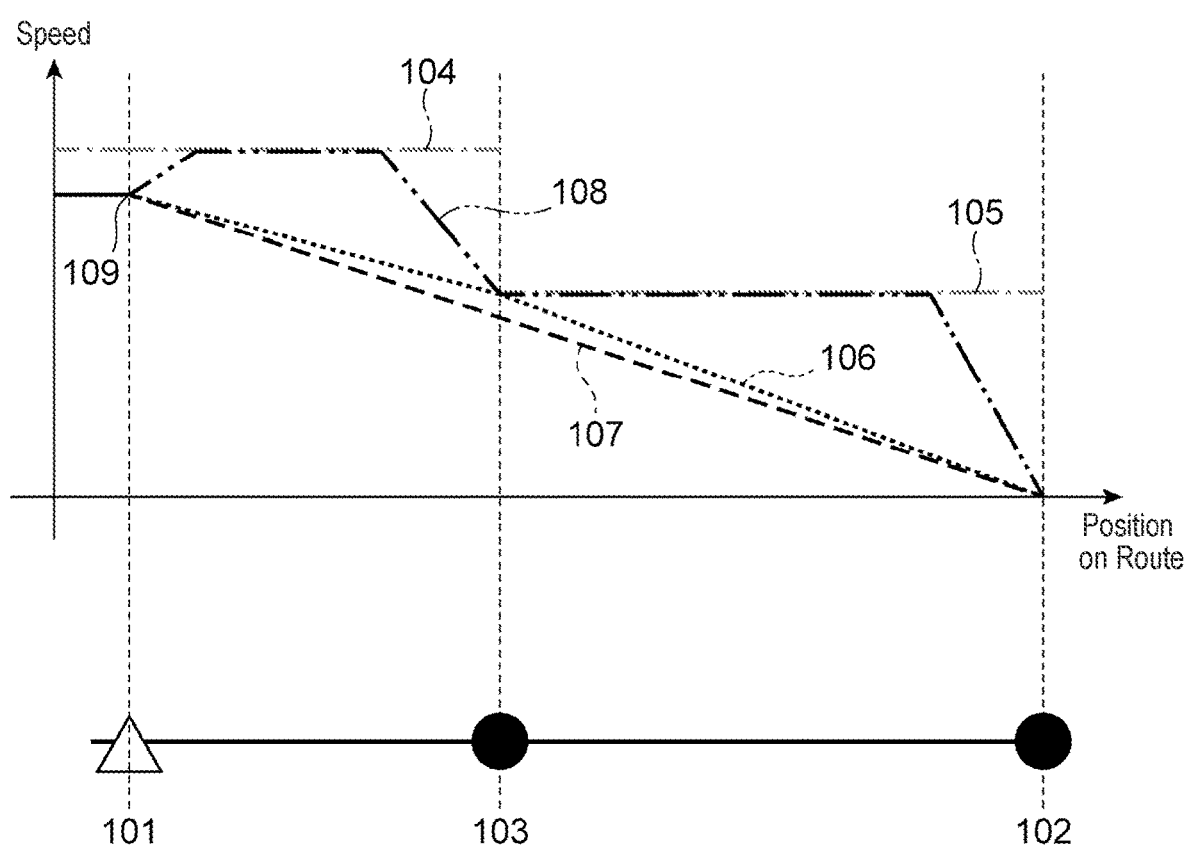
FIG. 11 is a drawing illustrating a concept of setting a speed profile.

In Step S73 subsequent to Step S72, the target acceleration calculator 36 sets a maximum speed profile from the current inertia speed of the unmanned dump truck 1 and a positional relation with the node as a speed change point, and calculates the target acceleration. FIG. 11 illustrates an example of the speed profile in the case of traveling from the current position to the destination while decreasing the speed. As illustrated in FIG. 11, a node (waypoint) 103 is present between a current position 101 and a destination 102. The speed profiles at the respective positions are illustrated as a graph in the upper side.

In FIG. 11, one-dot chain lines indicate the speed limits set to the link. The speed limit is divided into a speed limit 104 between the current position 101 and the waypoint 103 and a speed limit 105 between the waypoint 103 and the destination 102. For example, three speed profiles are considered. The first one is a speed profile in which the speed is decreased from a speed 109 at the current position 101 to the speed limit 105 at the waypoint 103, and then, further decreased to the destination 102 as illustrated by a dotted line 106. The second one is a speed profile in which the speed is constantly decreased from the current position 101 to the destination 102 as illustrated by a dashed line 107. The third one is a speed profile in which the speed is once increased to the speed limit 104, 105 for traveling at the maximum speed, and the speed is changed to drive at the speed limit of each node as illustrated by a two-dot chain line 108.

The setting of the speed profile is selected based on various factors such as a given period for arriving at the destination, priority in travel, and the like. In this embodiment, since the following process is not changed even when any speed profile is employed, here, a description will be given using the speed profile of the constant deceleration illustrated by the dashed line 107.

The target acceleration calculator 36 calculates the target acceleration based on the set speed profile. When a distance from the current position 101 to the destination 102 is L, the current inertia speed is v, and the unmanned dump truck 1 stops at the destination, a target acceleration a is obtained by Formula (11) below.

[Math. 11]

$$a = \frac{v^2}{2L} \tag{11}$$

In Step S74 subsequent to Step S73, the target torque calculator 35 calculates the target torque. The target torque is calculated by a back calculation of the driving torque from the above-described Formula (8) using the slip rate, the gradient, the vehicle weight, and the traction coefficient for each position illustrated in FIG. 9 calculated in the above-described Step S6 and stored in the storage unit 39. In Step S75 subsequent to Step S74, the target torque calculator 35 outputs the calculated target torque to the driving torque controller 37.

As illustrated in FIG. 3, in Step S8 subsequent to Step S7, the driving torque controller 37 controls the driving torque of the unmanned dump truck 1 to be the target torque, thereby performing a speed control of the unmanned dump truck 1. Thus, a sequence of the processes ends.

By executing a sequence of the processes from Step S1 to Step S8 for each cycle of the activation of the driving torque controller 37, the appropriate torque is output during the travel regardless of the change of the road surface state or the gradient, thus enabling the travel with high accuracy. Consequently, the unmanned dump truck can travel with high accuracy even on the road surface of the soft dirt.

According to the unmanned dump truck 1 configured as described above, since the driving torque is calculated in consideration of the road gradient of the travel route and the wheel sinking, the travel control of the unmanned dump truck 1 can be performed with high accuracy.

Second Embodiment

While the example assuming that only one unmanned dump truck travels is described in the first embodiment, the present invention is applied to an example of a plurality of unmanned dump trucks 1. That is, in the case of a plurality of unmanned dump trucks 1, sharing the road gradients, the traction coefficients, and the like calculated by the respective unmanned dump trucks 1 enables the efficient travel of these unmanned dump trucks 1, thus allowing the improvement of the operation efficiency. For example, like the approach to the hydraulic excavator in the drop cut method, since the road gradient, the traction coefficient, and the like significantly change when a route is additionally generated, sharing the road gradients, the traction coefficients, and the like calculated by the respective unmanned dump trucks 1 allows improving the efficiency of the drop cut method.

Therefore, in the second embodiment, the road gradients and the traction coefficients calculated by the respective unmanned dump trucks 1 are regularly transmitted to a control system 2, and managed in the control system 2 side. In the following description, only the difference between the second embodiment and the first embodiment will be described.

Figure 12:
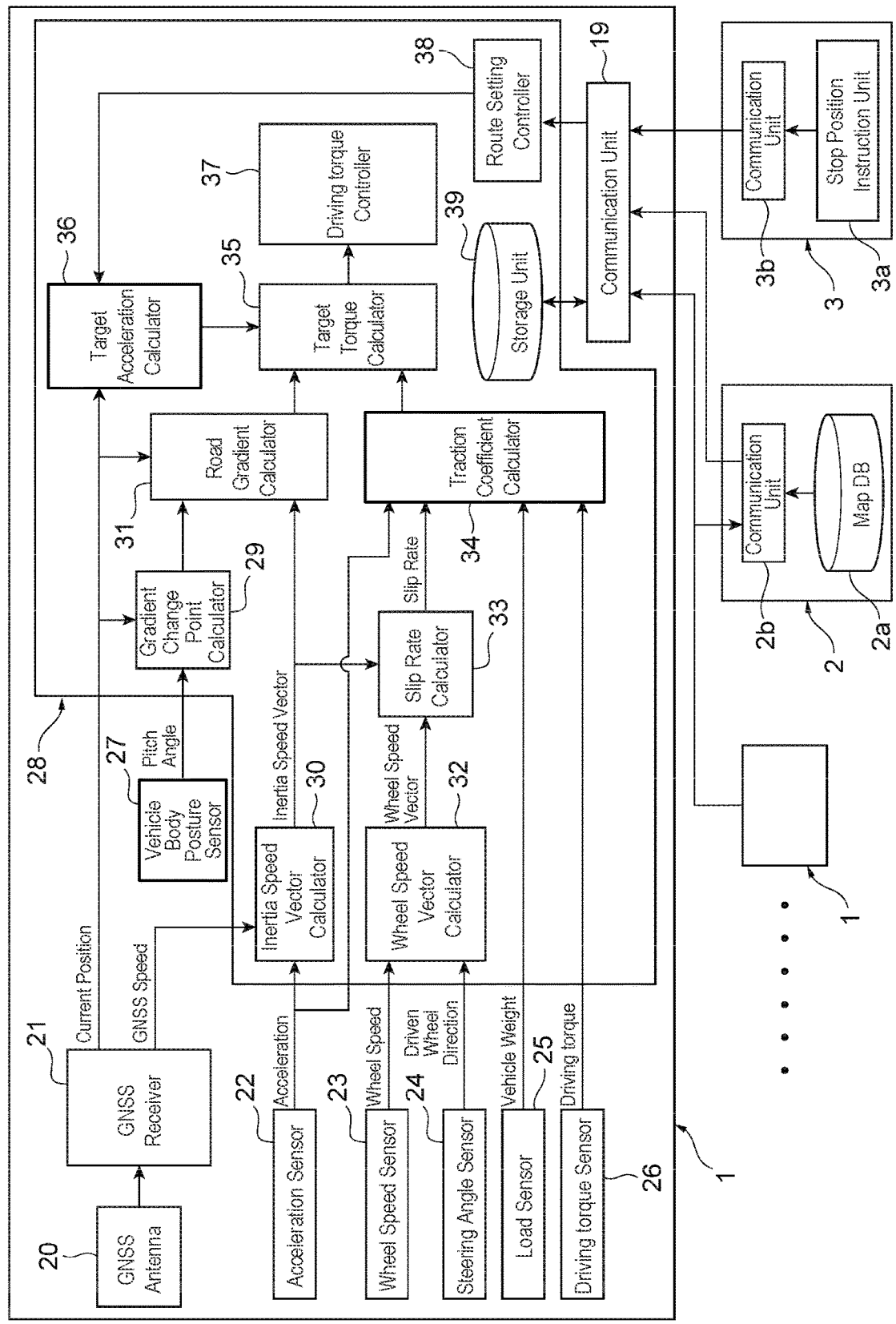
FIG. 12 is a block diagram illustrating a schematic configuration of an unmanned dump truck, a control system, and a hydraulic excavator according to a second embodiment.

FIG. 12 is a block diagram illustrating a schematic configuration of an unmanned dump truck, a control system, and a hydraulic excavator according to a second embodiment. In the example illustrated in FIG. 12, a plurality of the unmanned dump trucks 1, the control system 2, and a hydraulic excavator 3 constitute, for example, a mining machine management system. Each of the unmanned dump trucks 1 is configured to communicate with the control system 2 and the hydraulic excavator 3 via a communication unit 19 provided to each unmanned dump truck 1.

In this mining machine management system, a plurality of the unmanned dump trucks 1 each regularly transmit the calculated road gradient and traction coefficient together with the travel route to the control system 2 via the communication unit 19 in the unmanned dump truck 1 side and a communication unit 2b in the control system 2 side. The control system 2 stores and accumulates the travel routes and corresponding road gradients and traction coefficients transmitted from the respective unmanned dump trucks 1 in a map database 2a.

Figure 13:
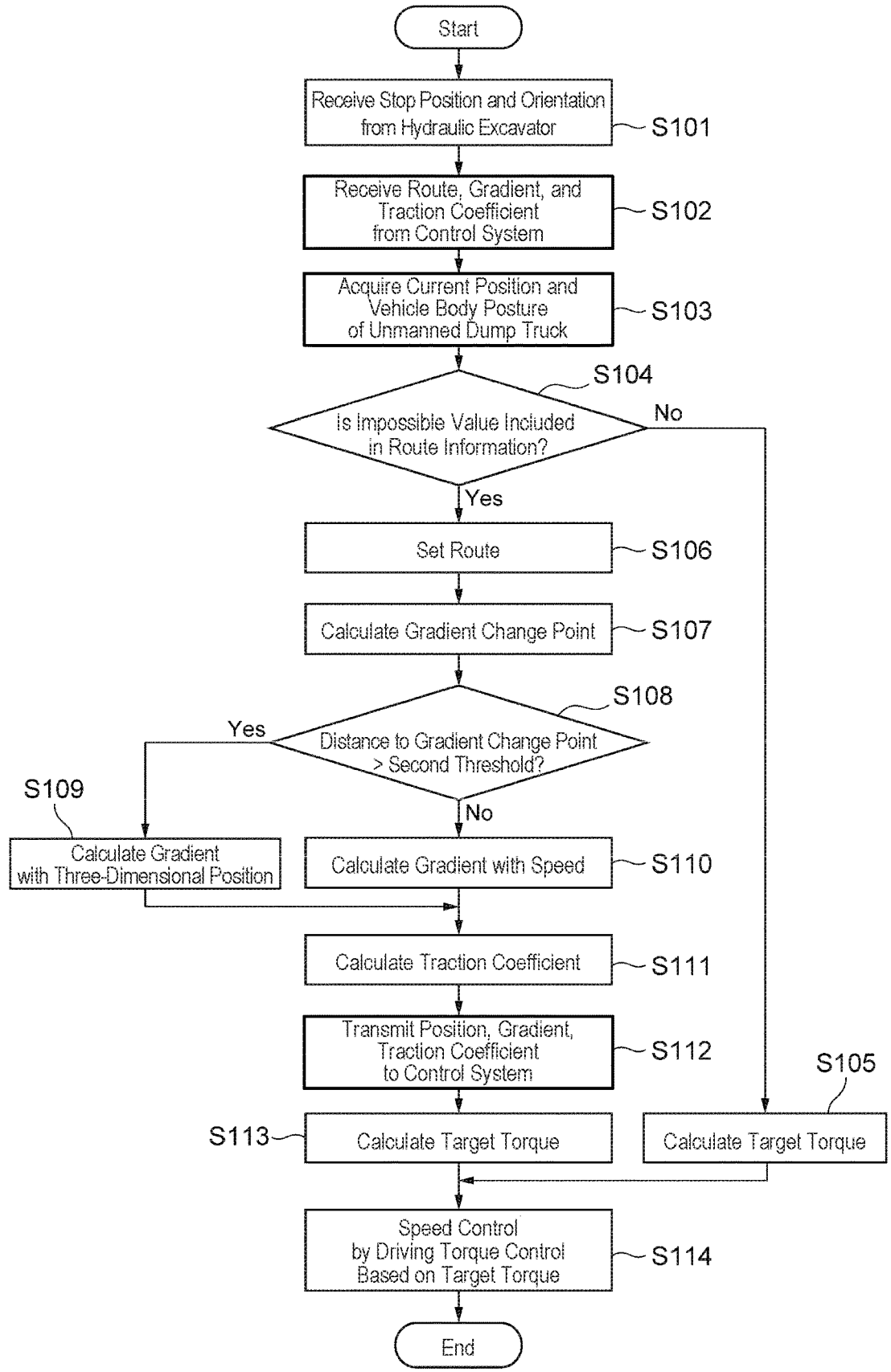
FIG. 13 is a drawing illustrating a processing flow of the second embodiment.

For example, when one unmanned dump truck 1 travels a route, the control device 28 of the unmanned dump truck 1 requires the control system 2 to provide information regarding the route on which the unmanned dump truck 1 is to travel, and when the route is stored in the map database 2a of the control system 2, the control device 28 receives the route and uses it for calculating the driving torque necessary for the travel of its own vehicle. On the other hand, when the route is not stored in the map database 2a, the control device 28 calculates the driving torque similarly to the first embodiment. The following describes the process in detail with reference to FIG. 13.

First, in Step S101, the control device 28 receives an instruction on the stop position and the stop orientation from a stop position instruction unit 3a of the hydraulic excavator 3 via the communication unit 19 in the unmanned dump truck 1 side and a communication unit 3b in the hydraulic excavator 3 side, and outputs the received stop position and stop orientation to the route setting controller 38.

In Step S102 subsequent to Step S101, the control device 28 transmits the information on the stop position to the control system 2 via the communication unit 19 in the unmanned dump truck 1 side and the communication unit 2b in the control system 2 side. The control system 2 reads information on the route to the stop position from the map database 2a based on the received stop position information, and transmits the route information to the control device 28 of the unmanned dump truck 1. When the information on the route to the stop position is transmitted, the road gradient and the traction coefficient corresponding to the route are transmitted together. The control device 28 outputs the received result to the route setting controller 38.

When the information on the route to the stop position is not present in the map database 2a (in other words, a case of not being stored in the map database 2a), the control system 2 transmits an impossible value such as "null" indicating a non-existent route to the control device 28. When only a part of the route to the stop position is present in the map database 2a, the control system 2 transmits the route present in the map database 2a, and also transmits an impossible value such as "null" indicating a non-existent route.

In Step S103 subsequent to Step S102, similarly to Step S1 described in the first embodiment, the current position and the vehicle body posture of the unmanned dump truck 1 are acquired.

In Step S104 subsequent to Step S103, the control device 28 determines whether the route information received in Step S102 includes the impossible value or not. When the route information is determined not to include the impossible value (in other words, when the route information includes the entire route to the stop position), since the road gradient and the traction coefficient corresponding to the route are acquired, the process transitions to Step S105.

In Step S105, the target torque is calculated by the method similar to that of the above-described Step S7. At this time, the target torque is calculated using the road gradient and the traction coefficient acquired from the control system 2. After the target torque is calculated, the process transitions to Step S114.

Figure 14:
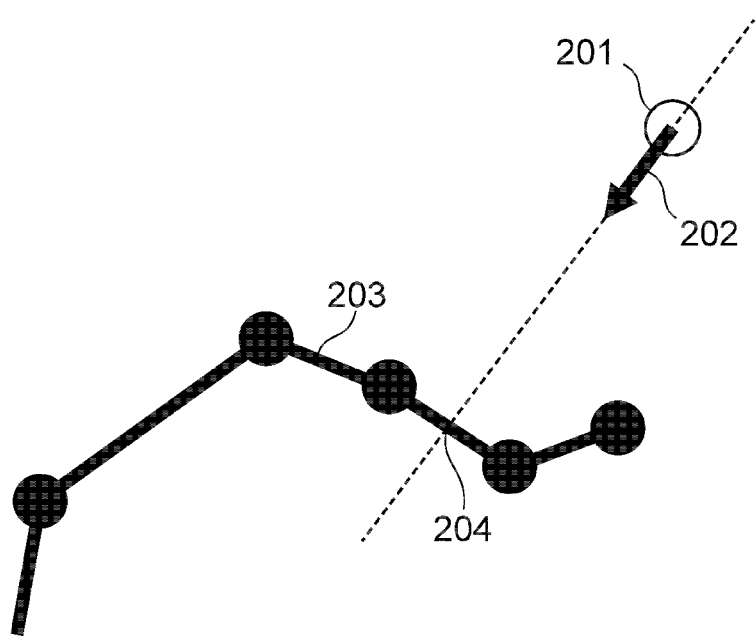
FIG. 14 is a drawing illustrating an exemplary route setting of the second embodiment.

Meanwhile, when the route information is determined to include the impossible value such as "null" in Step S104, the process transitions to Step S106. In Step S106, since this unmanned dump truck 1 generates the route at first, the route is newly set by the route setting controller 38. At this time, for example, as illustrated in FIG. 14, the route setting controller 38 draws a straight line passing through a stop position 201 as the destination in a stop instruction orientation 202 of the unmanned dump truck 1 at first, and obtains an intersection point 204 with a route 203 acquired from the control system 2.

Next, the route setting controller 38 sets the travel route to the intersection point 204 by including a switchback or the like so as to make the unmanned dump truck 1 in the orientation. Note that the travel from the stop position 201 to the intersection point 204 is assumed to be only straight ahead. The setting of the route illustrated in FIG. 14 is merely an example, the route may be set by other methods, and the same effects are provided.

Since Steps S107 to S111 subsequent to Step S106 are similar to Steps S2 to S6 described in the first embodiment, the repeated explanations will be omitted. In the calculation of the inertia speed vector in Step S110, since the inertia speed calculation flag is "0 (zero)" in the case of traveling straight ahead, the wheel speed of the driven wheels can be used as a substitution. That is, in the case of traveling straight ahead, the travel distance along the road surface may be calculated from the wheel speed of the front wheels 11 as the driven wheels.

In Step S112 subsequent to Step S111, the road gradient calculated in Step S109 or Step S110 and the traction coefficient calculated in Step S111 are transmitted to the control system 2 together with the current position. The control system 2 receives the information, and stores the information in the map database 2a or updates the map database 2a.

In Step S113 subsequent to Step S112, the target torque is calculated by the method similar to that of Step S7 described in the first embodiment. In Step S114, the driving torque of the unmanned dump truck 1 is controlled based on the target torque calculated in Step S105 or Step S113. Thus, a sequence of the processes ends.

According to this embodiment, the operational advantage similar to that of the first embodiment can be obtained. Additionally, since the route can be generated in a short time by sharing the road gradients and the traction coefficients calculated by a plurality of the unmanned dump trucks 1, a plurality of the unmanned dump trucks 1 can be efficiently traveled, thus allowing the improvement of the operation efficiency.

While embodiments of the present invention have been described in detail, the present invention is not limited to the above-described embodiments, but various kinds of changes of design are allowed within a range not departing from the spirits of the present invention described in the claims. For example, the present invention is applied to a modification in which a part of the first embodiment and a part of the second embodiment are mutually interchanged or mutually combined. In this case, the effect similar to that of the first embodiment or the second embodiment is obtained.

REFERENCE SIGNS LIST

1 Unmanned dump truck
2 Control system
3 Hydraulic excavator
19 Communication unit
20 GNSS antenna
21 GNSS receiver
22 Acceleration sensor
23 Wheel speed sensor
24 Steering angle sensor
25 Load sensor
26 Driving torque sensor
27 Vehicle body posture sensor
28 Control device
29 Gradient change point calculator
30 Inertia speed vector calculator
31 Road gradient calculator
32 Wheel speed vector calculator
33 Slip rate calculator
34 Traction coefficient calculator
35 Target torque calculator
36 Target acceleration calculator
37 Driving torque controller
38 Route setting controller
39 Storage unit

The invention claimed is:

1. A dump truck comprising:
a GNSS receiver that measures a position and a speed of the dump truck traveling in a mine based on a radio wave received from a positioning satellite;
a vehicle body posture sensor that measures a vehicle body posture of the dump truck;
an acceleration sensor that measures an acceleration of the dump truck;
a wheel speed sensor that measures a wheel speed based on a wheel rotation speed of the dump truck;
a steering angle sensor that measures a steering direction of the dump truck;
a load sensor that measures a vehicle weight of the dump truck including a load weight;
a driving torque sensor that measures a driving torque of drive wheels of the dump truck; and
a control device that controls the dump truck,
wherein the control device:
calculates a road gradient of a travel route based on the position and the speed measured by the GNSS receiver, the vehicle body posture measured by the vehicle body posture sensor, and the acceleration measured by the acceleration sensor;
calculates a slip rate of a road surface based on the speed measured by the GNSS receiver, the acceleration measured by the acceleration sensor, the wheel speed measured by the wheel speed sensor, and the steering direction that is a driven wheel direction measured by the steering angle sensor, and calculates a traction coefficient based on the calculated slip rate, the acceleration measured by the acceleration sensor, the vehicle weight measured by the load sensor, and the driving torque measured by the driving torque sensor;
calculates a target torque of the dump truck based on the calculated road gradient and the calculated traction coefficient; and
controls the driving torque of the drive wheels to be the calculated target torque.

2. The dump truck according to claim 1,
wherein the control device sets a route to a destination, calculates a target acceleration of the dump truck based on the set route to the destination and the position measured by the GNSS receiver, and calculates the target torque based on the calculated target acceleration, the calculated road gradient, and the calculated traction coefficient.

3. The dump truck according to claim 1,
wherein the control device calculates an inertia speed vector of the dump truck based on the speed measured by the GNSS receiver and the acceleration measured by the acceleration sensor, calculates a wheel speed vector based on the wheel speed measured by the wheel speed sensor and the steering direction measured by the steering angle sensor, and calculates the slip rate based on the calculated inertia speed vector and the calculated wheel speed vector.

4. The dump truck according to claim 3,
wherein the control device calculates a gradient change point of the road surface based on the position measured by the GNSS receiver and the vehicle body posture measured by the vehicle body posture sensor, and calculates the road gradient based on the calculated gradient change point, the position measured by the GNSS receiver, and the calculated inertia speed vector.

5. The dump truck according to claim 3,
wherein the control device calculates each of a horizontal advance distance of the dump truck based on the position measured by the GNSS receiver and a travel distance along the road surface based on the calculated inertia speed vector, and calculates the road gradient based on the calculated horizontal advance distance and the calculated travel distance using a trigonometric function.

6. The dump truck according to claim 1, further comprising
a communication unit that communicates with a control system that controls a plurality of the dump trucks, wherein the control device transmits and receives a road gradient and a traction coefficient corresponding to a travel route to/from the control system via the communication unit.

7. A dump truck comprising:

a GNSS receiver that measures a position and a speed of the dump truck traveling in a mine based on a radio wave received from a positioning satellite;

a vehicle body posture sensor that measures a vehicle body posture of the dump truck;

an acceleration sensor that measures an acceleration of the dump truck;

a wheel speed sensor that measures a wheel speed based on a wheel rotation speed of the dump truck;

a steering angle sensor that measures a steering direction of the dump truck;

a load sensor that measures a vehicle weight of the dump truck including a load weight;

a driving torque sensor that measures a driving torque of drive wheels of the dump truck; and a control device that controls the dump truck, wherein the control device:

calculates a road gradient of a travel route based on the position and the speed measured by the GNSS receiver, the vehicle body posture measured by the vehicle body posture sensor, and the acceleration measured by the acceleration sensor;

calculates a traction coefficient based on the speed measured by the GNSS receiver, the acceleration measured by the acceleration sensor, the wheel speed measured by the wheel speed sensor, the steering direction that is a driven wheel direction measured by the steering angle sensor, the vehicle weight measured by the load sensor, and the driving torque measured by the driving torque sensor;

sets a route to a destination, calculates a target acceleration of the dump truck based on the set route to the destination and the position measured by the GNSS receiver, and calculates a target torque of the dump truck based on the calculated target acceleration, the calculated road gradient, and the calculated traction coefficient; and controls the driving torque of the drive wheels to be the calculated target torque.

* * * * *